Figure 1:
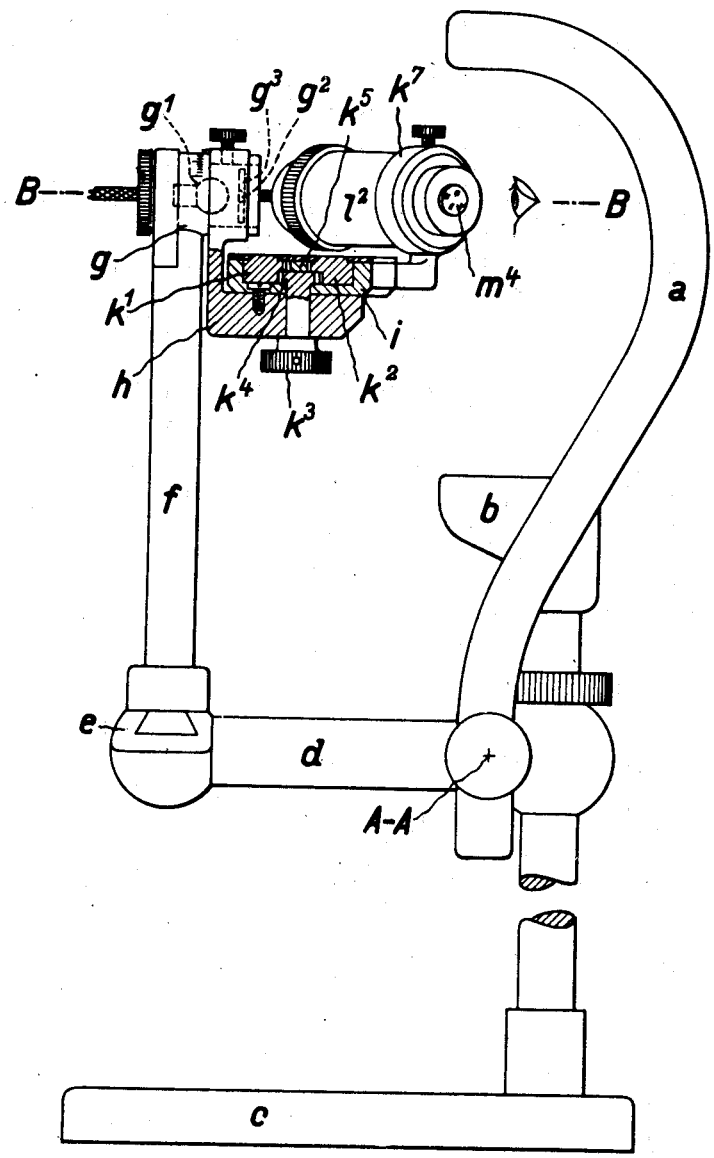

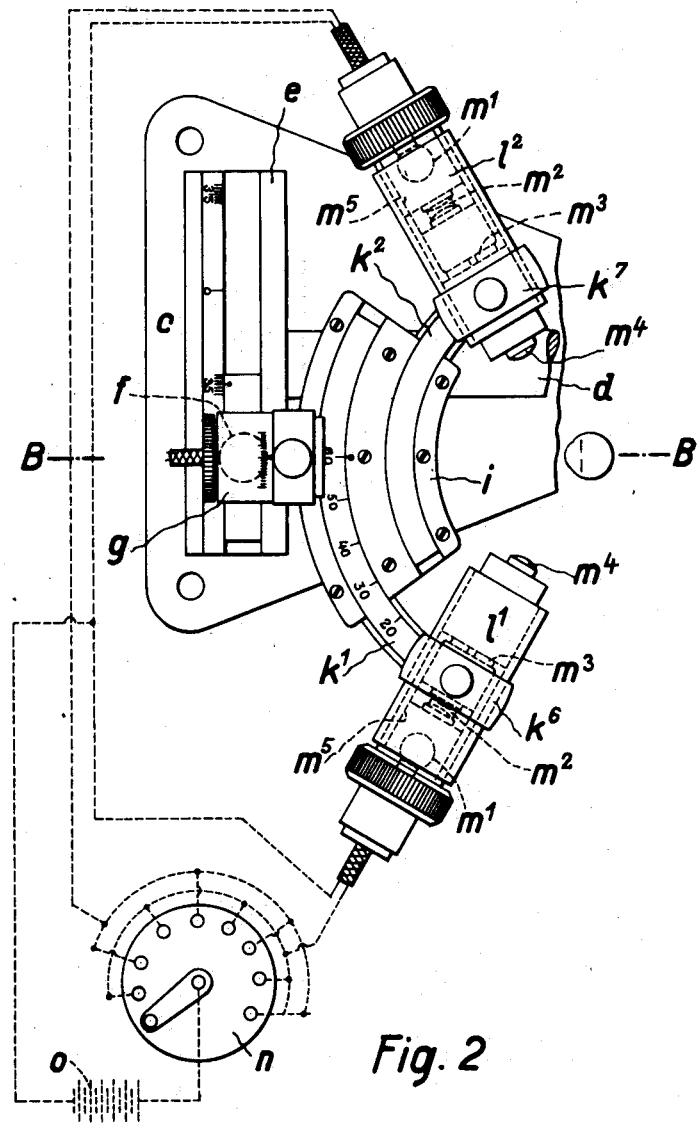

Patented Nov. 8, 1932

1,887,115

UNITED STATES PATENT OFFICE

GEORG BRAUN, OF PRAGUE, CZECHOSLOVAKIA, ASSIGNOR TO THE FIRM CARL ZEISS, OF JENA, GERMANY

INSTRUMENT FOR THE EXAMINATION OF THE REACTION OF THE EYE PUPILS WHEN DIFFERENT PARTS OF THE RETINA ARE ILLUMINATED

Application filed April 11, 1932, Serial No. 604,605, and in Germany April 23, 1931.

The present invention provides an instrument for examining in a very simple and reliable manner the reaction of the eye pupil by illuminating different parts of the retina.

The new instrument comprises a head and chin rest, a mark for adjusting the viewing direction of the eye to be examined, and an illumination device having a point diaphragm and producing directed light, the optical axis of this illumination device intersecting the viewing direction of the eye to be examined approximately in the entrance pupil of this eye. The illumination device, which is displaceable along a circular guide whose centre coincides with the point at which the optical axis of the illumination device intersects the viewing direction, is so constructed that the aperture of the point diaphragm may be imaged on the far-point ball of the eye to be examined.

The alterations of the pupil in successive illuminations of two spots on the retina which are symmetrical to the viewing direction, for instance of two equally directed parts of the right and the left half of the retina, is of special interest. When using only one illumination device, the desired spot on one half of the retina is to be illuminated, the pupil size then obtaining measured, the corresponding part of the other half of the retina illuminated, and the size of the pupil measured another time.

It is more convenient to use two illumination devices whose optical axes are symmetrical to the viewing direction of the eye to be examined and both of which are displaceable along circular guides the centre points of which lie in the point of intersection of the optical axes of the illumination devices and the viewing direction. This method offers the possibility to illuminate alternatively in quick succession both halves of the retina. In this case it is sufficient to examine whether there arises in this alternative illumination an alteration of the size of the pupil, which is easily found out with a comparatively quickly changing illumination.

When using incandescent lamps as light sources for the illumination devices it is convenient to effect the change in the illumination by means of a changing switch belonging to both illumination devices, which permits to effect several changes by simple manipulations.

In order to easily maintain the symmetry of the optical axes of the illumination devices with respect to the viewing direction, the two devices are conveniently coupled to each other in such a way that, by one single manipulation, they can be displaced conjointly through equal angles relatively to the viewing direction.

It has proved to be advantageous to make the circular guides for the illumination devices rotatable about the viewing axis in such a manner that also the halves of the retina which are to be examined can be varied.

In the accompanying drawings, which illustrate a constructional example of the object of the invention, Figure 1 is an elevation partly in a section and Figure 2 part of a plan view.

The instrument represented in the drawings has a head rest $a$ and a chin rest $b$ which are fixed to a base plate $c$. The chin rest $b$ is altitudinally adjustable, and the head rest $a$ is tiltable forward and backward about an axis A—A. The chin rest $b$ is provided with an arm $d$ supporting a slide guide $e$ in which a column $f$ is displaceable, the column $f$ having at its upper end a cylindrical housing $g$ for an incandescent lamp $g^1$. That side of the housing $g$ which faces the head rest $a$ is covered by a plate $g^3$ having a small hole $g^2$. When the incandescent lamp $g^1$ is switched on, this hole $g^2$ is an illumination mark which, in connection with the head and chin rests, adjusts the viewing direction B—B of the eye to be examined. When the head rest is fixed, the viewing direction of the right as well as of the left eye can be adjusted for differently wide interpupillary distances by displacing the column $f$ in the slide guide $e$. The housing $g$ is provided with an arm $h$ which is rotatable about the axis of this housing $g$. The arm $h$ supports a body $i$ guiding two circular slides $k^1$ and $k^2$. By means of a milled head $k^3$ and two toothed wheels $k^4$ and $k^5$ rigidly connected to the milled head $k^3$ the slides $k^1$ and $k^2$ are conjointly adjustable in such a manner that they are turned through equal angles. On the slide $k^1$ is fixed, in a sleeve $k^6$, an illumination device $l^1$, and on the slide $k^2$, in a sleeve $k^7$, an illumination device $l^2$. Each of these two illumination devices, which are displaceable in the appertaining sleeves in forward and backward directions, contains an incandescent lamp $m^1$, a condenser $m^2$, a point diaphragm $m^3$, and a projection objective $m^4$. The condenser $m^2$ projects an image of the incandescent filament of the lamp $m^1$ in the aperture of the diaphragm $m^3$, and the objective $m^4$ an image of the diaphragm aperture on the far-point ball of the eye to be examined. With a view to obtain these images with normal-sighted and ametropic eyes, the incandescent lamp $m^1$, the condenser $m^2$ and a point diaphragm $m^3$ of each illumination device are provided in a tube $m^5$. Together with these tubes $m^5$ the said parts are axially displaceable relatively to the objective $m^4$ in the housing of the respective device. A changing switch $n$ serves for alternatively connecting the two incandescent lamps $m^1$ to the current circuit of a storage battery $o$.

I claim:

1. An instrument for the examination of the reaction of the eye pupils when different parts of the retina are illuminated, comprising a head and chin rest, a mark for adjusting the viewing direction of the eye to be examined, this mark being adjustably connected to the head and chin rest, an illumination device connected to the head and chin rest, the optical axis of the illumination device intersecting the viewing direction of the eye to be examined approximately in the entrance pupil of this eye, a circular guide whose centre coincides with the point of intersection of the optical axis of the illumination device and the viewing direction, the illumination device being displaceable in the said guide, and a narrow diaphragm provided in the illumination device and adapted to be imaged on the far-point ball of the eye to be examined.

2. An instrument for the examination of the reaction of the eye pupils when different parts of the retina are illuminated, comprising a head and chin rest, two illumination devices connected to the head and chin rest, the optical axes of the said two illumination devices intersecting the viewing direction of the eye to be examined approximately in the entrance pupil of this eye, two circular guides whose centres coincide with the point of intersection of the optical axis of the illumination device and the viewing direction, each of the two illumination devices being displaceable in one of the said guides, and two narrow diaphragms each of which is provided in one of the illumination devices and adapted to be illuminated by the appertaining illumination device on the far-point ball of the eye to be examined.

3. In an instrument according to claim 2, a driving mechanism coupled to the two illumination devices and adapted to displace these two illumination devices along their circular guides through equal angles.

4. In an instrument according to claim 2, the circular guides for the illumination devices being rotatable about an axis coinciding with the viewing direction of the eye to be examined.

5. In an instrument according to claim 2, a switching device for switching on and off the two illumination devices, the switching devices being adapted to alternatively switch the illumination devices on and off in rapid succession.

GEORG BRAUN.